United States Patent
Kamiya

(10) Patent No.: US 9,420,048 B2
(45) Date of Patent: Aug. 16, 2016

(54) MOBILE DEVICE, METHOD OF ACTIVATING APPLICATION, AND PROGRAM

(75) Inventor: Masaki Kamiya, Kanagawa (JP)

(73) Assignee: NEC CORPORATION, Tokyo (JP)

(*) Notice: Subject to any disclaimer, the term of this patent is extended or adjusted under 35 U.S.C. 154(b) by 228 days.

(21) Appl. No.: 14/008,030

(22) PCT Filed: Mar. 30, 2012

(86) PCT No.: PCT/JP2012/002228
§ 371 (c)(1),
(2), (4) Date: Sep. 27, 2013

(87) PCT Pub. No.: WO2012/132464
PCT Pub. Date: Oct. 4, 2012

(65) Prior Publication Data
US 2014/0019510 A1 Jan. 16, 2014

(30) Foreign Application Priority Data
Mar. 31, 2011 (JP) .................................. 2011-080508

(51) Int. Cl.
*G06F 15/16* (2006.01)
*H04L 29/08* (2006.01)
(Continued)

(52) U.S. Cl.
CPC ................ *H04L 67/18* (2013.01); *G01C 21/20* (2013.01); *H04M 1/72569* (2013.01); *H04M 1/72572* (2013.01); *H04M 2250/10* (2013.01)

(58) Field of Classification Search
CPC ....................................................... H04L 67/18
USPC .................................................. 709/201, 219
See application file for complete search history.

(56) References Cited

U.S. PATENT DOCUMENTS

| 5,910,799 A | 6/1999 | Carpenter et al. |
| 2006/0156209 A1* | 7/2006 | Matsuura et al. ............. 714/798 |

(Continued)

FOREIGN PATENT DOCUMENTS

| CN | 1754147 A | 3/2006 |
| JP | 10-55259 A | 2/1998 |

(Continued)

OTHER PUBLICATIONS

International Search Report for PCT/JP2012/002228 dated May 22, 2012.

(Continued)

*Primary Examiner* — Glenford Madamba
(74) *Attorney, Agent, or Firm* — Sughrue Mion, PLLC

(57) ABSTRACT

A mobile device includes a storage unit which stores application specification information that specifies an application to be activated in association with movement information that is a combination of a movement source and a movement destination, a position information acquisition unit which repeatedly acquires current position information of a user, and a control unit that calculates a movement direction of the user based on a history of the position information that the position information acquisition unit acquires, selects any one of the movement information that is stored in the storage unit based on the calculated movement direction and the current position information of the user, reads the application specification information associated with the selected movement information from the storage unit, and activates the application associated with the application specification information that is read.

9 Claims, 14 Drawing Sheets

(51) Int. Cl.
*H04M 1/725* (2006.01)
*G01C 21/20* (2006.01)

(56) References Cited

U.S. PATENT DOCUMENTS

| 2007/0219708 A1* | 9/2007 | Brasche | G01C 21/32 |
| | | | 701/457 |
| 2010/0069115 A1 | 3/2010 | Liu | |
| 2010/0070235 A1 | 3/2010 | Cho et al. | |

FOREIGN PATENT DOCUMENTS

| JP | 2003-304184 A | 10/2003 |
| JP | 2008-102860 A | 5/2008 |
| JP | 2008262251 A | 10/2008 |
| JP | 2010-109789 A | 5/2010 |
| WO | 2004-077291 A1 | 9/2004 |

OTHER PUBLICATIONS

Communication dated Dec. 18, 2014 from the State Intellectual Property Office of the People's Republic of China in counterpart Application No. 201280016755.X.

Communication dated Jun. 16, 2015 from the Japanese Patent Office in counterpart application No. 2011-080508.

Communication dated Aug. 11, 2014, from the European Patent Office in counterpart European Application No. 12763045.7.

* cited by examiner

FIG. 14

| SET CLOCK INFORMATION | CLOCK INFORMATION GROUP | SELECTION MENU ITEMS | POSITION INFORMATION | POSITION INFORMATION GROUP | SPEED INFORMATION | SPEED INFORMATION GROUP | GETTING ON AND OFF INFORMATION |
|---|---|---|---|---|---|---|---|
| 2006.1.10.20.36 | WEEKDAY NIGHT | M15 | E···N··· | NEAR COMPANY | 0 | STOP | ABSENCE |
| 2006.1.10.19.25 | WEEKDAY EVENING | M20 | E···N··· | COMPANY | 1 | STOP | ABSENCE |
| 2006.1.10.9.8 | WEEKDAY SECOND HALF IN THE MORNING | M1 | E···N··· | COMPANY | 0 | STOP | ABSENCE |
| 2006.1.10.8.15 | WEEKDAY FIRST HALF IN THE MORNING | M6 | E···N··· | KANAGAWA | 60 | MIDDLE SPEED | PRESENCE |
| 2006.1.10.7.50 | WEEKDAY FIRST HALF IN THE MORNING | M3 | E···N··· | NEAR HOME | 4 | WALK | ABSENCE |
| 2006.1.10.7.35 | WEEKDAY FIRST HALF IN THE MORNING | M4 | E···N··· | HOME | 0 | STOP | ABSENCE |
| 2006.1.1.11.42 | WEEKEND SECOND HALF IN THE MORNING | M15 | E···N··· | SAITAMA | 5 | WALK | ABSENCE |
| 2006.1.1.10.40 | WEEKEND SECOND HALF IN THE MORNING | M6 | E···N··· | TOKYO | 75 | HIGH SPEED | PRESENCE |
| | | | ··· | | | | |

MOBILE DEVICE, METHOD OF ACTIVATING APPLICATION, AND PROGRAM

CROSS REFERENCE TO RELATED APPLICATIONS

This application is a National Stage of International Application No. PCT/JP2012/002228 filed Mar. 30, 2012, claiming priority based on Japanese Patent Application No. 2011-080508 filed Mar. 31, 2011, the contents of all of which are incorporated herein by reference in their entirety.

TECHNICAL FIELD

The present invention relates to a mobile device which has a function of activating an application, a method of activating an application and a program.

BACKGROUND ART

Currently, mobile terminal devices such as a mobile phone, a PDA (Personal Digital Assistant) device, a laptop personal computer, and a mobile game player are widespread in use. Various applications are installed in these mobile terminal devices, and terminals in which additional applications can be installed through downloads have also been published. However, as the applications are increased, an operation to look for and activate a desired application becomes complicated.

On the other hand, using a mobile terminal device, the user of the terminal device may frequently uses specific applications of the mobile terminal device in specific places or situations. For example, using the mobile terminal device, the user activates a browser to watch news at a company or activates a music player to listen to music while commuting. Therefore, there are disclosed a mobile terminal device and a method of displaying an operation menu, which when the user selects a menu, store position information, time, movement situation, whether or not the user is using transportation, and the menus selected by the user; extract menus that are frequently selected in a situation similar to a present situation when the menu is displayed; and preferentially display operation menus of applications that are predicted to be used, thereby facilitating an operation for the user to select an application from the menus (for example, refer to Patent document 1 and Patent document 2). In these technologies, for example, as shown in FIG. 14 that is described in Patent document 2, based on data of a table used when menu items are set, in which time, position information, speed information, and the like are set, a priority is determined and operation menus to be displayed are selected and presented.

RELATED DOCUMENT

Patent Document

[Patent Document 1] Japanese Unexamined Patent Publication No. 2010-109789
[Patent Document 2] Japanese Unexamined Patent Publication No. 2008-102860

DISCLOSURE OF THE INVENTION

However, in the aforementioned technologies, position information and presence of movements are aggregated as comparison conditions, but a direction in which the user is moving is not distinguishable. For this reason, even if the user is likely to activate different applications in a forward path and a backward path during the movement at substantially the same time, the same application might be presented for both the forward path and the backward path. Further, during the movement, even in the same movement path, the position where the user activates an application may be different from the position where the user activated the application in the past, and the position where the user wants to display an application may be in a different position than where the user activated the application in the past. For this reason, it is determined that there is very little positional relationship in the application that the user wants to activate, and thus there is a problem in that accuracy of determining an optimal application decreases. Accordingly, it is desirable to develop a technology which reliably displays menus corresponding to the desire of the user, by associating the user's movement direction in more detail with the position.

An object of the present invention is to provide a mobile device, a method of activating an application, and a program which can activate an optimal application by a combination of a movement source and a movement destination.

According to the present invention, there is provided a mobile device including: a storage unit which stores application specification information that specifies an application to be activated in association with movement information that is a combination of a movement source and a movement destination;

a position information acquisition unit which repeatedly acquires current position information of a user; and a control unit that calculates a movement direction of the user based on a history of the position information that the position information acquisition unit acquires, selects any one of the movement information that is stored in the storage unit based on the calculated movement direction and the current position information of the user, reads the application specification information associated with the selected movement information from the storage unit, and activates the application associated with the application specification information that is read.

According to the present invention, there is provided a method of activating an application including storing application specification information that specifies an application to be activated in association with movement information that is a combination of a movement source and a movement destination, in a storage unit, causing a mobile device to repeatedly acquire current position information of a user;

causing the mobile device to calculate a movement direction of the user based on a history of the acquired position information, to select any one of the movement information that is stored in the storage unit based on the calculated movement direction and the current position information of the user, and to read the application specification information associated with the selected movement information from the storage unit, and causing the mobile device to activate the application associated with the application specification information that is read.

According to the present invention, there is provided a program for a mobile device, the mobile device being accessible to a storage unit which stores application specification information that specifies an application to be activated in association with movement information that is a combination of a movement source and a movement destination, the program causing the mobile device to execute:

a function of repeatedly acquiring current position information of a user;

a function of calculating a movement direction of the user based on a history of the acquired position information, selecting any one of the movement information that is stored in the storage unit based on the calculated movement direction and the current position information of the user, and reading the application specification information associated with the selected movement information from the storage unit; and a function of activating the application associated with the application specification information that is read.

In addition, the present invention may be a computer-readable storage medium that records the program.

According to the present invention, it is possible to activate an optimal application by combining a movement source and a movement destination.

BRIEF DESCRIPTION OF THE DRAWINGS

These and other objects, features, and advantages of the invention will be apparent through reference to the description of preferred embodiments and accompanying drawings.

FIG. 14 is a configuration diagram of a table in the related art used when menu items are set, shown in Patent document 2.

DESCRIPTION OF EMBODIMENTS

Hereinafter, embodiments of the present invention will be described. In addition, embodiments described below are exemplary, and the present invention is not limited to configurations of the following embodiments.

Figure 1:
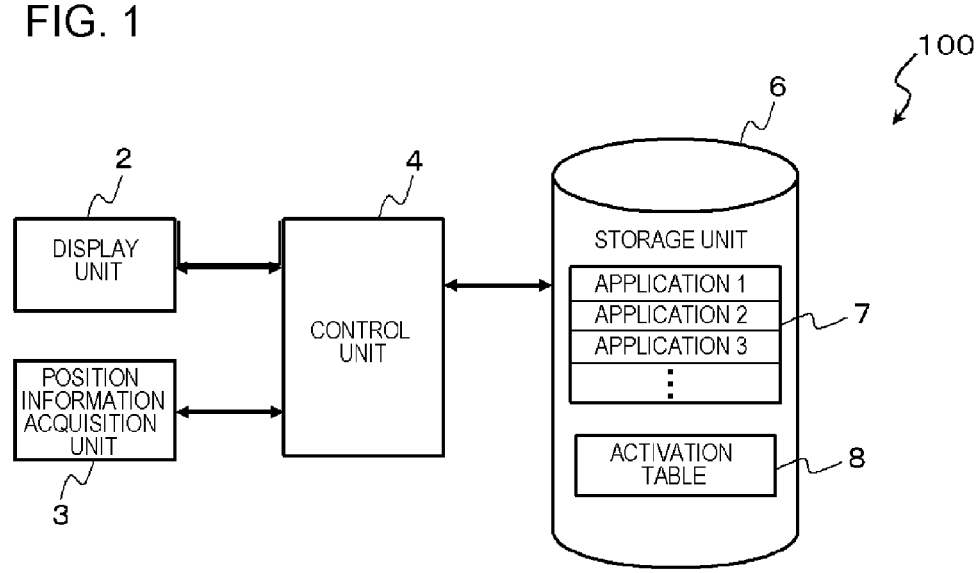
FIG. 1 is a conceptual diagram illustrating a system configuration example of a mobile terminal device according to the present embodiment.

As illustrated in FIG. 1, a mobile terminal device 100 according to the embodiments is configured to include a control unit 4, a storage unit 6 that is accessed by the control unit 4 and stores at least an activation table 8 in which applications to be activated are set in association with position information and movement destination direction of the user, and a position information acquisition unit 3 that acquires current position information of the user at a predetermined time interval. Then, control unit 4 acquires the associated application to be activated from the activation table 8 of the storage unit 6, at each movement direction and current position that are calculated from the position information previously acquired by the position information acquisition unit 3 and the current position information and the position information of the movement destination of the user, and displays the corresponding application on the display unit 2.

Further, in a method of displaying an application on the mobile terminal device 100 according to the embodiments including the control unit 4, the storage unit 6 that is accessed by the control unit 4 and stores at least the activation table 8 in which the applications to be activated is set in association with the position information and the movement destination direction of the user, a position information acquisition unit 3 that acquires the current position information of the user at a predetermined time interval, and a display unit 2 of the application, the method of displaying an application implemented by the computer includes a step that acquires the current position information of the user at a predetermined time interval, a step that calculates the movement direction from the previously acquired position information and the current position information, a step that reads the application to be activated from the activation table of the storage unit at each movement direction and current position, and a step that displays the application that is read.

In the mobile terminal device and the method of displaying an application on the mobile terminal device, when the user activates the mobile terminal device, not only the current position of the user but also the direction in which the user moves (movement direction) are considered, and thus it is possible to present an optimal application.

Hereinafter, each embodiment described above will be described in more detail. The first, second and third embodiments below are examples that implement the method of displaying an application on the mobile terminal device by incorporating the aforementioned mobile terminal device into a relational database. In addition, the configuration of the mobile terminal device is not limited to the following embodiments, but can be applied to various embodiments if the device can be carried by the user and various applications are incorporated in the device.

First Embodiment

System Configuration

Figure 2:
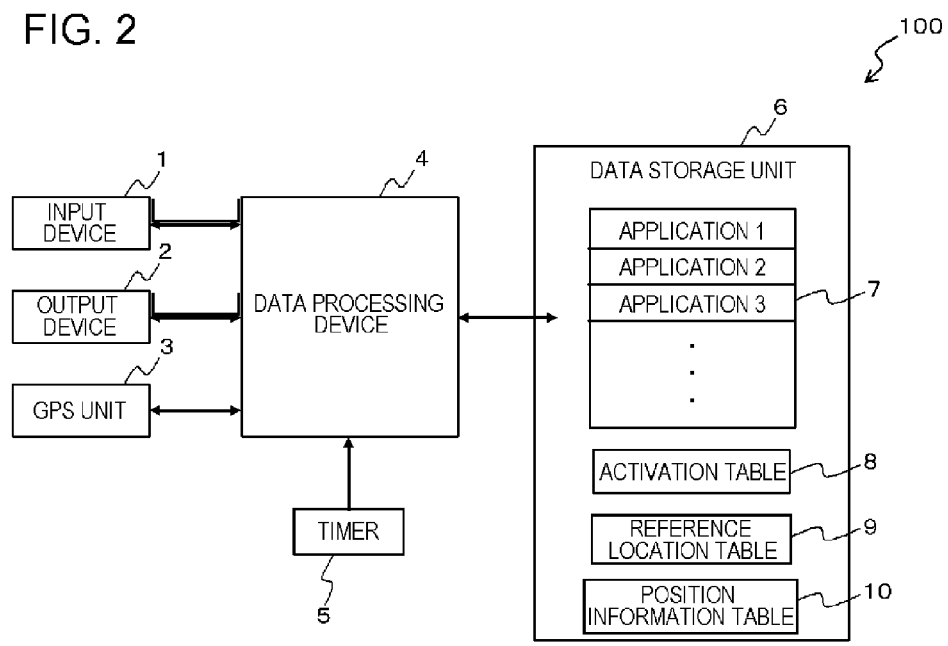
FIG. 2 is a conceptual diagram illustrating a system configuration example of a mobile terminal device according to a first embodiment.

FIG. 2 is a conceptual diagram illustrating a system configuration example of a mobile terminal device 100 according to a first embodiment. The mobile terminal device 100 according to the first embodiment is equipped with a GPS unit 3 having a GPS (Global Positioning System) function for acquiring position information, and is configured to be able to access a GPS satellite at a certain time interval by a timer 5 and perform a position confirmation.

As shown in FIG. 2, the mobile terminal device 100 of the embodiment is configured to include an input device 1 such as a keyboard and a touch panel through which the user inputs data and various instructions, an output device 2 as a display unit such as a display device, a GPS unit 3 as a position information acquisition unit which repeatedly acquires position information by communication with the GPS system, a data processing device 4 as a control unit which executes applications and controls each device, a timer 5 which obtains a time to acquire position information by the GPS unit 3, and a data storage device 6 which saves various data.

The data storage device 6 stores various information such as an application table 7 which stores a plurality of applications, an activation table 8, a reference location table 9, and a position information table 10. In addition, the data storage device 6 may be a database on the hardware, or may be a USB, a micro SB, a CD, a DVD, a Blu-ray Disc, or the like. Further, in order to improve an access speed, when the mobile terminal device 100 is activated, it may be possible to read various kinds of information from the data storage device 6 to the memory of the computer, and access the information on the memory. Then, after the activation of the application is terminated, the information may be written to the original device or periodically written for preparation for an unexpected shutdown.

For example, in a case where the mobile terminal device 100 is a mobile phone, the application table 7 stores a telephone function, a mail function (mailer), an internet function (browser), a game function, an image acquisition function (camera), a music play function, and the like. The application table 7 stores various applications that are installed in the mobile terminal device 100 from the start, or added through a download. Among these applications, the application, that is set in information of the application to be activated (hereinafter, referred to as "activation application information") 8a that is set in the activation table 8 below, is activated or displayed on the output device 2.

Figure 3:
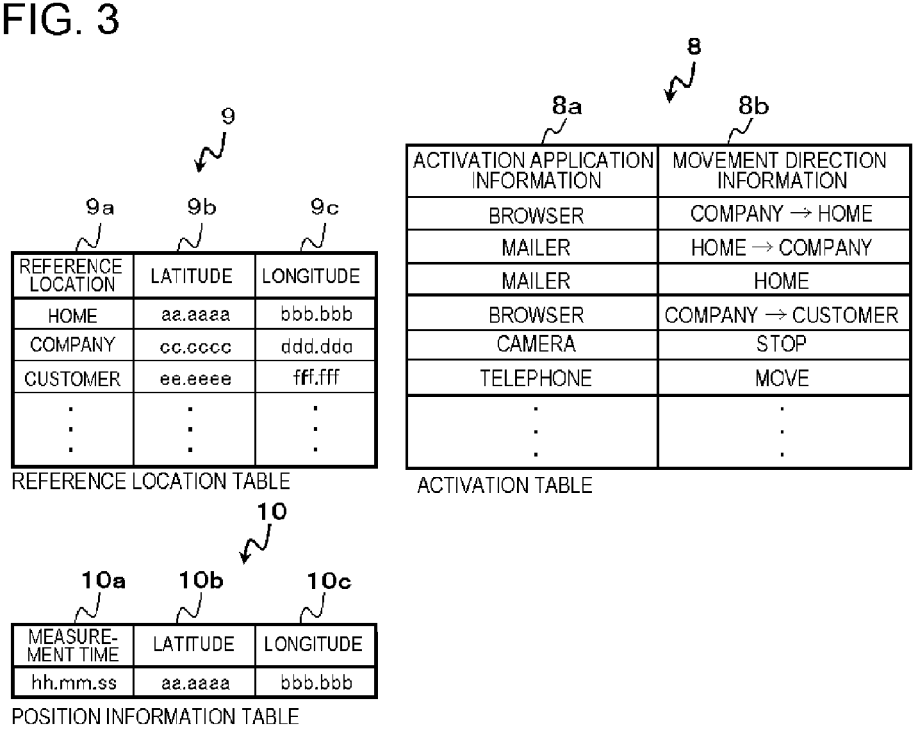
FIG. 3 is a configuration diagram of a reference location table, an activation table of applications associated with the reference location table and a position information table.

The activation table 8 has the configuration shown on the upper right side of the paper of FIG. 3, and includes an activation application information storage area 8a which stores various kinds of activation application information such as a telephone function, a mailer, and a browser, and a movement direction information storage area 8b which stores a movement direction (combination of a movement source and a movement destination), for example, from the company to home, from home to the company, or the like. The reference location table 9 has the configuration shown on the upper left side of the paper of FIG. 3, and includes a reference location storage area 9a which stores names of places as references such as home, a company, and a customer, a latitude storage area 9b which stores the latitude of each reference location, and a longitude storage area 9c which stores the longitude of each reference location. The position information table 10 has the configuration shown on the lower left side of the paper of FIG. 3, and includes a measurement time storage area 10a which stores a measurement time (acquired from the timer 5) when the current position is measured by the GPS unit 3, a latitude storage area 10b which stores the latitude of the current position, and a longitude storage area 10c which stores the longitude of the current position.

Operation Example

Figure 4:
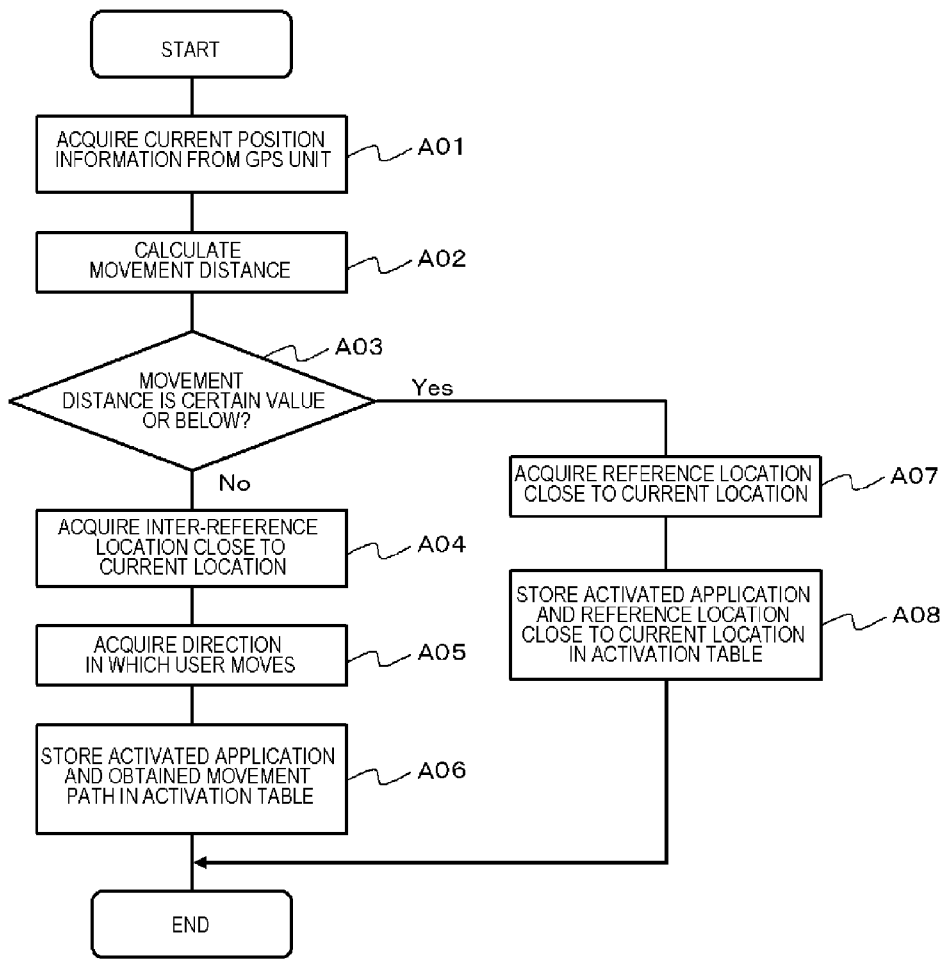
FIG. 4 is a flowchart illustrating an operation example when information is acquired during activation of an application, using the mobile terminal device according to the first embodiment.
Figure 5:
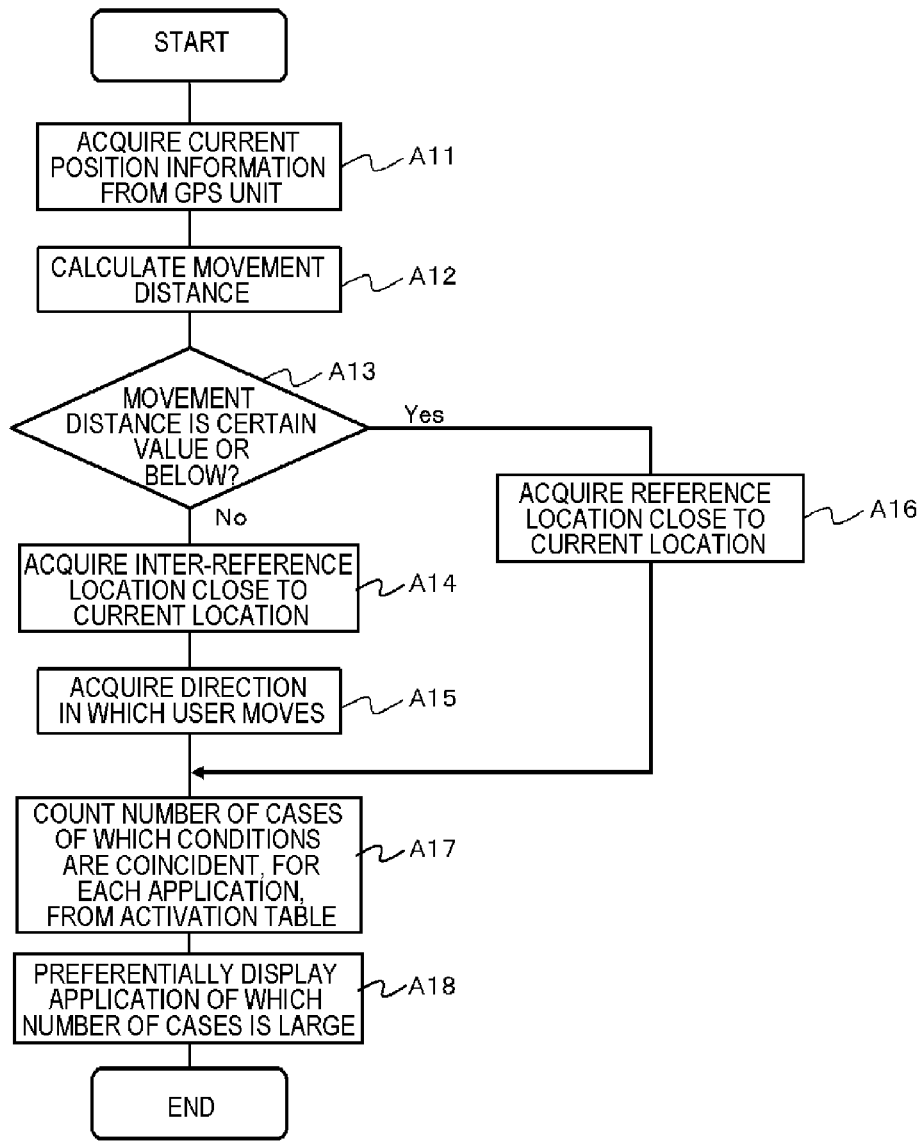
FIG. 5 is a flowchart illustrating an operation example when an application is displayed during activation of the mobile terminal device according to the first embodiment.

Next, an entire operation of the mobile terminal device 100 of the embodiment will be described in detail, according to the flowcharts of FIGS. 4 and 5, using the system configuration diagram of the mobile terminal device 100 of FIG. 2, the table configuration diagram of FIG. 3, and the explanatory diagrams of FIGS. 7 to 11. The operations of the mobile terminal device 100 includes an operation of storing application specification information that specifies the application to be activated and an operation of displaying the application according to the stored application information.

At first, as an initial setting, the information of a plurality of reference locations as the center of activity of the user is stored in the reference location table 9 of the data storage device 6 by the data processing device 4. As the information stored in the reference location table 9, as shown in FIG. 3, the position as the center of activity such as home and the company is stored and registered in the reference location storage area 9a, and the latitude and the longitude of the reference location are respectively stored and registered in the latitude storage area 9b and the longitude storage area 9c. The method of acquiring and registering the current position information by the GPS unit 3 is used as a registration method, in the embodiment. However, the present invention is not limited thereto, but a method in which the user directly inputs a number from the input device 1 may be used, or a method which registers a number using a map application may be used. Further, the latitude and the longitude of the current location are acquired from the GPS unit 3 at a certain time interval by the timer 5, and the measurement time at the time measured by the timer 5 is also acquired, so the acquired measurement time, the latitude and the longitude are stored and updated in the measurement time storage area 10a, the latitude storage area 10b, and the longitude storage area 10c of the position information table 10. In addition, in the activation table 8, a blank or zero is entered as an initial value, and information is stored each time when the application is activated.

Next, the operation during the activation of the application, that is, the operation to collect information as to which application is activated according to the current position and the movement direction and to store the information in the activation table 8 will be described according to the flowchart in FIG. 4. First, during activation of the application in the mobile terminal device 100, the GPS unit 3 acquires the current position information by communication with the GPS system (step A01). Next, the time and the position (latitude and longitude) that are previously measured by the GPS unit 3 are acquired from the measurement time storage area 10a, the latitude storage area 10b, and the longitude storage area 10c of the position information table 10, and the movement distance is obtained from the current position information that is acquired in step A01 (step A02).

It is determined whether the movement distance is a certain value or below (step A03). In addition, in a case of assuming a range of a 30-minute walk as "stay", for example, 2 km is preferable as the certain value of this movement distance. Next, in a case of the certain value or less (Yes), the distance between the current location and each reference location is obtained from the latitude and the longitude of the GPS unit 3, and the reference location closest to the current location is obtained (step A07). Then, the application identification information of the application that activated by the user is acquired and stored in the activation application information storage area 8*a* of the activation table 8, and the obtained reference location (movement direction) is stored in the movement direction information storage area 8*b* (step A08). At this time, in a case where the user does not move and the reference location is not present within a certain distance, the reference location is set as "stop" (for example, when taking a picture with a camera, since the user is likely to stay in a place within a certain range, this case is stored as "camera" in the activation application information storage area 8*a* and as "stop" in the movement direction information storage area 8*b*, of the activation table 8 of FIG. 3).

Figure 6:
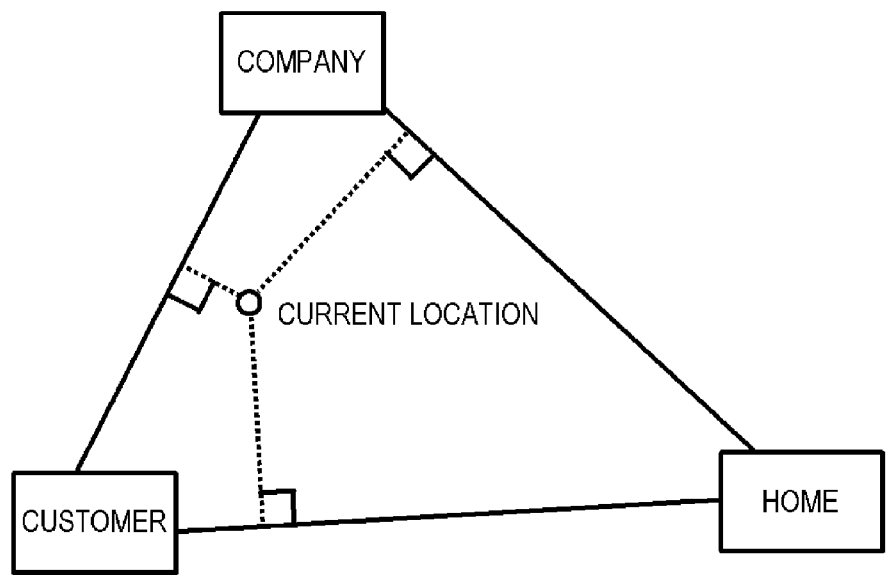
FIG. 6 is an explanatory diagram illustrating an outline of a step of obtaining a position closest to a current location, in a method of activating an application using the mobile terminal device according to the first embodiment.
Figure 7:
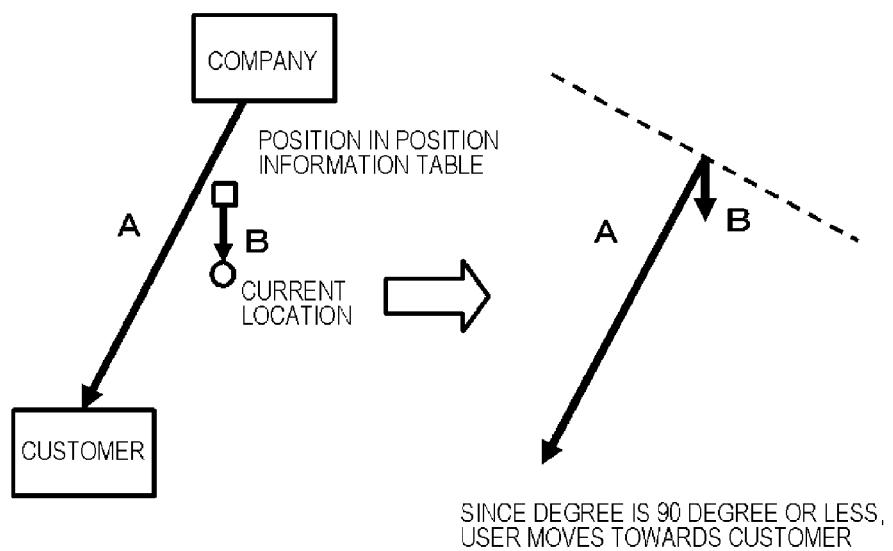
FIG. 7 is an explanatory diagram illustrating a process to figure out that the user of the mobile terminal device moves towards a customer from a company.
Figure 8:
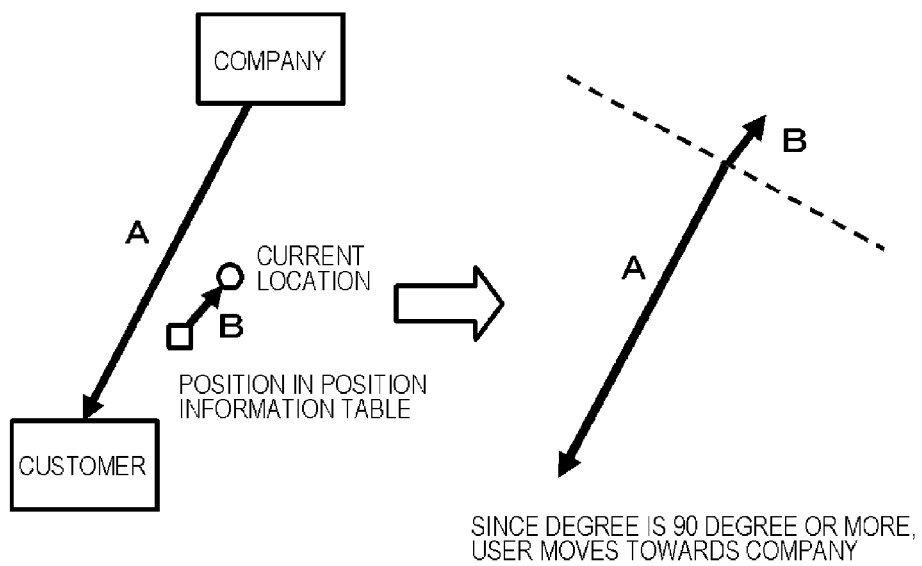
FIG. 8 is an explanatory diagram illustrating a process to figure out that the user of the mobile terminal device moves towards the company from the customer.
Figure 9:
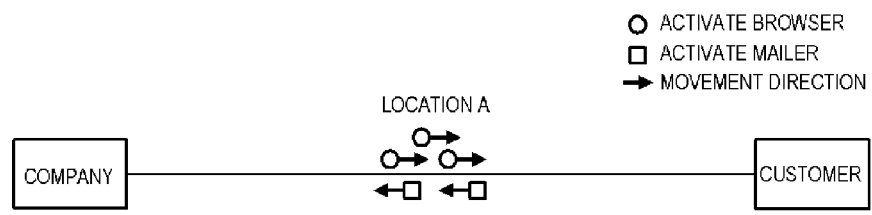
FIG. 9 is an explanatory diagram illustrating that it is possible to respectively present a mail screen in a case where the user moves towards the company and a browser screen in a case where the user moves towards the customer.

On the other hand, in step A03, in a case where it is determined that the movement distance is longer than the certain value (No), among straight lines which connect between each reference location, the linear distance of the inter-reference location closest to the current location is obtained (step A04). For example, in the case of FIG. 6, the distance between the company and the customer (refer to the path A in FIGS. 7 and 8) becomes the closest linear distance.

Next, it is determined to which reference location the user moves from the moved direction, with respect to the obtained linear distance (step A05). For example, in FIG. 7, if it is considered based on the position information stored in the position information table 10 and the information of the current location (the latitude of the latitude storage area 10*b* and the longitude of the longitude storage area 10*c*), since direction B (degree), in which the user moves, with respect to the direction of path A between the company and the customer is 90 degrees or less, it is found that the user moves towards the customer from the company. On the other hand, in FIG. 8, since direction B (degree), in which the user moves, with respect to the direction of path A between the company and the customer is 90 degrees or more, it is found that the user moves towards the company from the customer.

From the above information, the activated application (for example, stored as "browser" in the fourth row of the activation table 8 of FIG. 3) is stored in the activation application information storage area 8*a* of the activation table 8, and the obtained movement path (a combination of a movement source and a movement destination: for example, stored as "company→customer" in the fourth row of the activation table 8 of FIG. 3) is stored in the movement direction information storage area 8*b* (step A06). Here, in a case where the distance between the linear distance that connects between each reference location and the current location is not the certain value or less, "movement" is stored in the movement direction information storage area 8*b* (for example, refer to the column of "telephone" of the activation application information storage area 8*a* in the sixth row of the activation table 8 in FIG. 3). In addition, when information is stored in the activation table 8, if there is no empty storage area (8*a*, 8*b*, and the like), the oldest activation information is deleted and new activation information is stored.

Next, the operation when an application is activated and displayed will be described according to a flowchart in FIG. 5. First, when the user activates the mobile terminal device 100, the data storage device 6 acquires the information (latitude and longitude) of the current location from the GPS unit 3 (step A11), and calculates a movement distance from the latitude of the latitude storage area 10*b* and the longitude of the longitude storage area 10*c* that are previously acquired and saved in the position information table 10 (step A12).

From the calculation result, it is determined whether the movement distance is the certain value or less (step A13), in a case where the movement distance is the certain value or less (Yes), the reference location (for example, "home", and the like) closest to the current location is obtained as the movement direction information (step A16). Here, in a case where there is no reference location within a certain distance, "stop" is regarded as the movement direction information.

On the other hand, in a case where the movement distance is the certain value or more (No), similar to the time when the application is activated, the linear direction of inter-reference location closest to the current location is obtained (step A14), and the direction in which the user moves is obtained, so the movement path is set as the movement direction information (step A15).

Next, the movement direction information that is obtained from the information of the current location and each movement direction information of the activation table 8 are compared to extract the matched parts, and the number of extracted cases is counted for each application from the activation application information stored in activation application information storage area 8*a* of the activation table 8 (step A17). Based on the counted result, the specification information of the application of which the number of cases is large (that is, the application that is frequently used) is preferentially selected, the application associated with the selected application identification information is activated and displayed on the output device 2 (in the embodiment, a screen) (step A18).

Through the above process, it is possible to present the application that is frequently used during the movement in each path, by classifying applications that are activated in each path of reference location. Specific examples will be described using FIGS. 9 to 11. In addition, in each figure, in each location (hereinafter, referred to as "location A"), "◯" indicates a case where a browser is activated as the application, "□" indicates a case where a mailer is activated, and "Δ" indicates a case where a phone book (that is, a telephone function) is activated. Further, arrows ("←" and "→") indicate the movement direction of the user. For example, in the case of the situation of FIG. 9, in the related art, when an application is displayed in location A, the browser having a high activation number is preferentially displayed in the both cases where the user moves towards the company and towards the customer. However, in the case of the embodiment, it is possible to present a mailer in the case where the user moves towards the company and a browser in the case where the user moves towards the customer.

Figure 10:
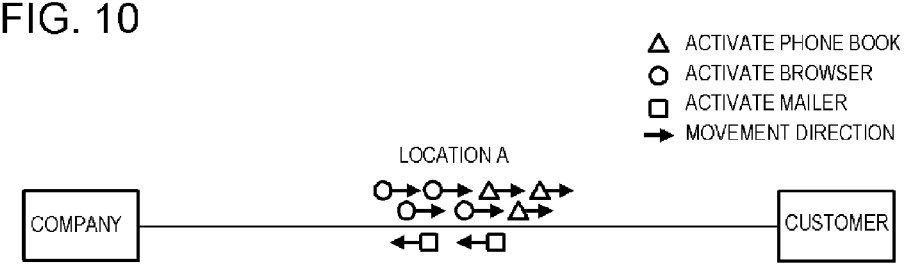
FIG. 10 is an explanatory diagram illustrating that it is possible to give a priority to a presentation of a mailer screen in a case where the user moves towards the company, because a forward path and a backward path are distinguished between the company and the customer.

Further, in the case of the situation of FIG. 10, in the related art, even in the case where the user moves towards the company, the mailer is given lower priority than the browser and the telephone. In this manner, in the related art, in the case where application activation numbers are different in the forward path and the backward path, a proper application may have the lower priority. However, in the embodiment, since it is divided into the forward path and the backward path (that is, the movement direction is also considered), even in the case of FIG. 10, it is possible to give a high priority to the mailer in the case where the user moves towards the company.

Figure 11:
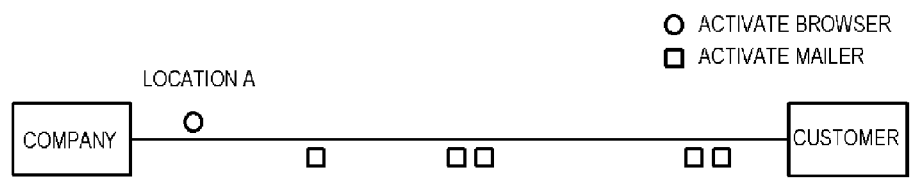
FIG. 11 is an explanatory diagram illustrating that it is possible to present a screen for a suitable application (in an example of FIG. 11, a mailer), because an application is determined in a path, even if there is a variation in an activation position of the mobile terminal device.

Further, in the case of the situation of FIG. 11, the mailer is frequently used during the movement between the company and the customer, but in the case of the related art, the browser that was previously activated near the location A may have priority. In this manner, in a case where there is a variation in the activation position, in the related art, a proper application may not be presented. However, in the embodiment, since the proper application is not determined in the position, but is determined in the path, even in the case of the situation of FIG. 11, it is possible to preferentially present the mailer. In this manner, in the mobile terminal device 100 of the embodiment, since the activated application is stored and determined at each movement direction, it is possible to present more proper application.

Action and Effect of First Embodiment

As described above, in the mobile terminal device 100 of the embodiment, it is possible to store and determine the status of the activation of the application for each direction in which the user moves. Consequently, even in a case where the frequently activated applications are different in the forward path and the backward path, the application having a high counted number is preferentially displayed, and thus it is possible to present a proper application. Further, since it is not affected by variations in an activation location due to the movement, it is possible to present a proper application according to the operation condition of the user.

Second Embodiment

System Configuration

Figure 12:
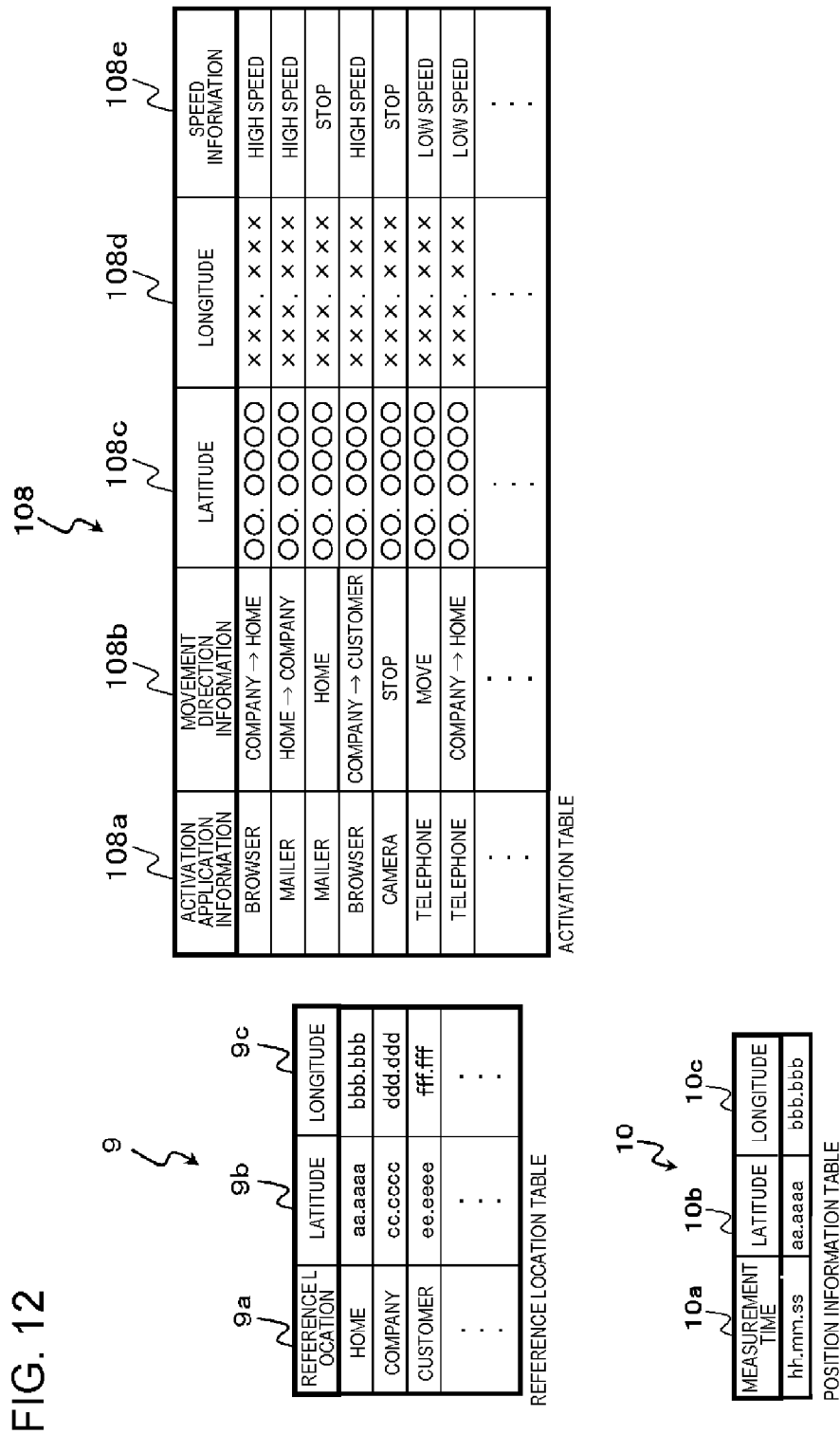
FIG. 12 is a configuration diagram of a reference location table, an activation table of applications associated with the reference location table and a position information table according to a second embodiment.

Next, the mobile terminal device of the second embodiment will be described. Since the system configuration of the mobile terminal device of the present embodiment is the same as the configuration of the first embodiment except for the structure of the activation table 108 of the data storage device 6, the illustration and the description of the same function will not be repeated. In FIG. 12, the structures of the reference location table 9, the activation table 108, and the position information table 10 of the embodiment are illustrated. In addition, since the reference location table 9 and the position information table 10 have the same configuration as the first embodiment, the same reference numbers as the first embodiment are used, and the detailed description thereof will not be repeated. On the other hand, the activation table 108 of the embodiment includes an activation application information storage area 108a which stores various activation application information such as a telephone function, a mailer and a browser, a movement direction information storage area 108b which stores the movement direction, for example, from the company to home, from home to the company, or the like, and further includes, as items different from the first embodiment, a latitude storage area 108c which stores the latitude of the current location, a longitude storage area 108d which stores the longitude of the current location, and a speed information storage area 108e which stores the movement speed.

Operation Example

Hereinafter, using the system configuration diagram of FIG. 2, the activation table 108 shown in FIG. 12, and the like, the entire operations of the mobile terminal device 100 of the embodiment will be described focused on the parts different from the first embodiment. In the mobile terminal device of the embodiment, firstly, during activation of an application, the movement distance is obtained from the position (the latitude of the latitude storage area 10b and the longitude of the longitude storage area 10c) of the previous time (the measurement time of the measurement time storage area 10a) that is stored in the position information table 10, and the current location (the current time and the latitude and longitude acquired by the GPS unit 3), the unit time from the previous activation time to the present application activation time is obtained from the activation time of the application that is acquired by the timer 5 and the previous measurement time that is stored in the measurement time storage area 10a of the position information table 10, and the distance is divided by the unit time to calculate the movement speed (hitherto, steps A11 and A12).

Depending on the speed obtained by the calculation, movement speeds are classified into a high speed, a low speed, and a stop. As a classification method, at first, where it is determined whether the movement speed is a certain value or less, for example, it is determined whether the movement speed is 2 km/h or less that is slower than walking (step A13), for example, in a case of Yes, it is determined as "stop", similar to the case where the movement distance is short that is described in step A07 and A08 in the first embodiment, the closest reference location ("stop") is stored in the movement direction information storage area 108b of the activation table 108 (step A16). As the reference of the classification of the high speed and the low speed, for example, a case where the movement speed is 20 km/h or more is set to be high and indicates a case where the user rides on a vehicle such as a train and an automobile of which speed is relatively high. Further, a case where the movement speed is less than 20 km/h indicates a case where the user rides on a vehicle such as a bicycle of which speed is relatively slow or the user walks. Similar to a case where there was a movement as described in steps A04 to A06 in the first embodiment, the straight line and the direction of an inter-reference location closest to the current location are obtained, and the path is stored in the movement direction information storage area 108b of the activation table 108. Further, the movement speed is stored as the movement speed information in the speed information storage area 108e of the activation table 108 (hitherto, step A14, A15).

Next, when the application is displayed on the output device 2 of the mobile terminal device, similar to the first embodiment, the present movement speed and the movement direction information are obtained, locations, where the movement speed and the movement direction information acquired from the activation table 108 are coincident, are extracted, extraction numbers are counted for each application and priority of each application is determined (step A17). Then, based on the result of the count, the application having a high counted number is preferentially activated and displayed on the output device 2 (step A18).

As described above, in the present embodiment, in addition to the paths, the movement speeds are stored in the activation table 108 and set as one of the determination items of status, thus it is possible to present the application that is more suitable for the status of the user. For example, when the user moves from the company towards home, it is possible to present different applications in a case where the user rides on the train or in a case where the user walks. For example, in FIG. 12, it is considered that the movement speed is "high speed" and "browser" is presented in a case where the user rides on the train, and the movement speed is "low speed" and "telephone" is presented in a case where the user walks.

Further, there are prepared the latitude storage area 108c and the longitude storage area 108d of the activation table 8 of FIG. 12 which respectively store the information of the latitude and longitude, and during the activation of the application, the activated position is stored in the latitude storage area 108c and the longitude storage area 108d of the activation table 108.

Further, when the application is displayed, in a case where each information acquired from the movement direction information storage area 108b and the speed information storage area 108e of the activation table 8 is coincident with the current direction in which the user moves acquired from the GPS unit 3 and the speed of the user, the distance between the current location and the latitude and longitude stored in the activation table 108 is obtained. A low score is given to a case where the distance is far and a high score is given to a case where the distance is close, and then the total value of the scores are obtained at each application, the applications are displayed on the output device 2 in an order of priority from the highest score.

Action and Effect of Second Embodiment

As described above, in the mobile terminal device of the embodiment, even in a case where the user moves in the same direction, it is possible to change an application to be displayed depending on the position, such as the application that is frequently used at a location close to the departure location and the application that is frequently used at a location close to the destination, and to present the application that is more suitable for the operation status.

Third Embodiment

System Configuration

Next, the mobile terminal device of the third embodiment will be described. Since in the mobile terminal device of the present embodiment, the system configuration is the same as the configuration of the first embodiment except for the operations, the illustration and the description of the functions will not be repeated.

Operation Example

Figure 13:
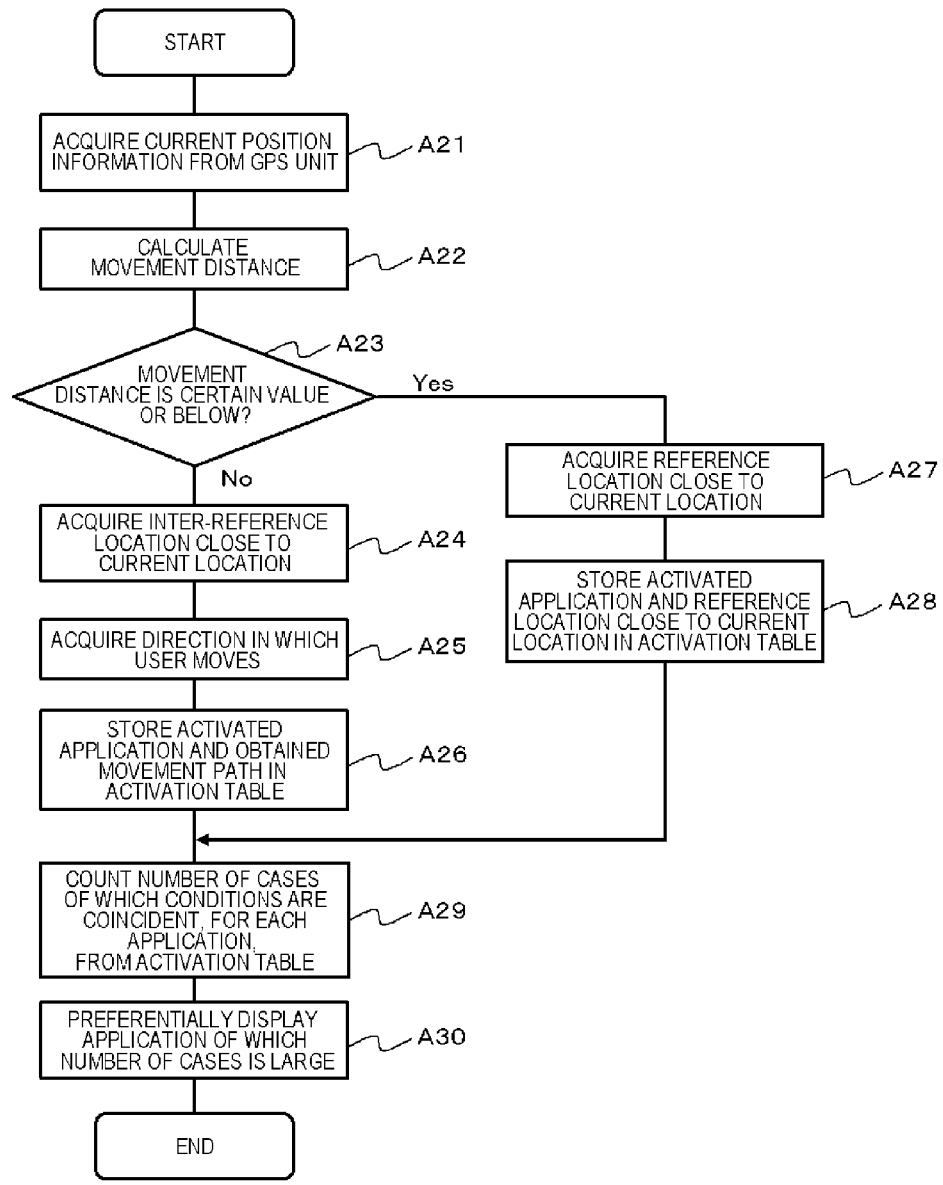
FIG. 13 is a flow chart illustrating an operation example that the mobile terminal device learns which is an activation application based on a movement direction, and the like during activation of an application, and then displays the application during activation of the mobile terminal device, using the mobile terminal device according to a third embodiment.

Next, according to a flowchart of FIG. 13, the entire operation examples of the mobile terminal device 100 of the present embodiment will be described in detail. The operations of the embodiment are different from the first and second embodiments in that in the first and second embodiments, an operation of learning (accumulating) whether any one of the applications is activated on the basis of the movement position and the movement direction and an operation of displaying the application in association with the information are separated. However, the present embodiment is different from the first and second embodiments in that the embodiment has a learning function to enhance a display performance while storing the application information to be activated each time. Hereinafter, the present embodiment will be described in detail.

Similar to each of the above embodiments, as an initial setting, the information of the reference location as the center of activity of the user is stored in the reference location table 9. In the embodiment, at first, similar to each of the above embodiments, at a certain time interval by the timer 5, the latitude and the longitude of the current location are obtained from the GPS unit 3, the measurement time of the time when is measured by the timer 5, and the latitude and longitude are stored and updated in the measurement time storage area 10a, the latitude storage area 10b, and the longitude storage area 10c of the position information table 10.

Next, during the activation of the application in the mobile terminal device 100, the current position information is obtained by the GPS unit 3 (step A21). Next, the time and the position (the latitude and the longitude) that were previously measured by the GPS unit 3 are acquired from the measurement time storage area 10a, the latitude storage area 10b, and the longitude storage area 10c of the position information table 10, and the movement distance is obtained from the current position information acquired in step A21 (step A22).

It is determined whether the movement distance is a certain value or less (step A23), and in a case where it is determined that the movement distance is the certain value or less (Yes), the distance between the current location and each reference location is obtained, and thus the closest reference location is obtained (step A27), and the application that is activated by the user and the reference location (movement direction) are stored in the activation table 8 (step A28).

On the other hand, in step A23, in a case where it is determined that the movement distance is longer than the certain value (No), among the straight lines which connect between each reference location, the linear distance of inter-reference location closest to the current location is obtained (step A24). Next, it is obtained to which reference location the user moves from the moved direction, with respect to the obtained linear distance (step A25). Then, the application that the user activates and the movement path are stored in the activation table 8 (step A26).

Next, when the application is displayed on the output device 2 of the mobile terminal device, similar to the second embodiment, locations, where the movement direction information acquired from the activation table 8 are coincident, are extracted, extraction numbers are counted for each application and priority of each application is determined (step A29). Then, based on the result of the count, the application having a high counted number is preferentially displayed on the output device 2 (step A30). In this case, similar to the second embodiment, the movement speed is calculated and used as the parameter of the priority determination.

Action and Effect of Third Embodiment

As described above, in the mobile terminal device 100 of the embodiment, a learning ability is increased by storing and accumulating the status of the activation of the application at each direction in which the user moves. For this reason, as the number that the mobile terminal device 100 is activated is increased, it is possible to present the application that is the most suitable for the operation condition of the user.

In addition, in the description of each embodiment, a plurality of steps are described and explained in order, but it is possible to change the orders of the plurality of steps within a range without interfering with the content. Further, the present invention is not limited to the aforementioned embodiments, but the contents of the embodiments can be combined to the extent that its contents are not contrary.

This application claims a priority based on Japanese patent application No. 2011-080508 filed on Mar. 31, 2011, and the entire disclosure is incorporated herein.

The invention claimed is:
1. A mobile device comprising:
a storage unit which stores application specification information that specifies an application to be activated in association with movement information that is a combination of a movement source and a movement destination;
a position information acquisition unit which repeatedly acquires current position information of a user; and
a control unit that:
identifies, from among a plurality of straight lines each of which connects two corresponding reference locations and wherein each straight line is orthogonal to a current position of the user, a straight line closest to a current position calculated from the current position information acquired by the position information acquisition unit;
calculates a movement direction of the user in the identified straight line and a movement speed of the user based on a change in the position information of the user;
selects any one of the movement information that is stored in the storage unit based on the two reference locations constituting the identified straight line, the calculated movement direction, and the calculated movement speed;

reads the application specification information associated with the selected movement information from the storage unit; and activates the application associated with the application specification information that is read.

2. The mobile device according to claim 1,
wherein the control unit calculates the movement direction of the user based on a history of the position information that the position information acquisition unit acquires, selects any one of the movement information that is stored in the storage unit based on the calculated movement direction and the current position information of the user, acquires the application specification information of the application, that the user activates, in association with the selected movement information, and stores the acquired application specification information in association with the movement information, in the storage unit.

3. The mobile device according to claim 2,
wherein the control unit selects the application specification information of the application that is frequently used for each movement information.

4. A method of activating an application comprising:
storing application specification information that specifies an application to be activated in association with movement information that is a combination of a movement source and a movement destination, in a storage unit;
causing a mobile device to repeatedly acquire current position information of a user;
causing the mobile device to:
identify, from among a plurality of straight lines each of which connects two corresponding reference locations and wherein each straight line is orthogonal to a current position of the user, a straight line closest to a current position calculated from the acquired current position information;
calculate a movement direction of the user in the identified straight line and a movement speed of the user based on a change in the position information of the user;
select any one of the movement information that is stored in the storage unit based on the two reference locations constituting the identified straight line, the calculated movement direction, and the calculated movement speed; and
read the application specification information associated with the selected movement information from the storage unit; and
causing the mobile device to activate the application associated with the application specification information that is read.

5. The method of activating an application according to claim 4, further comprising:
causing the mobile device to calculate the movement direction of the user based on a history of the acquired position information, selects any one of the movement information that is stored in the storage unit based on the calculated movement direction and the current position information of the user, and to acquire the application specification information of the application that the user activates, in association with the selected movement information; and causing the mobile device to store the acquired application specification information in association with the movement information, in the storage unit.

6. The method of activating an application according to claim 5, further comprising:
causing the mobile device to store the application specification information of the application that is frequently used in association with the movement information for each movement information, in the storage unit.

7. A non-transitory computer readable media recording a program for a mobile device, the mobile device being accessible to a storage unit which stores application specification information that specifies an application to be activated in association with movement information that is a combination of a movement source and a movement destination, the program causing the mobile device to execute:
a function of repeatedly acquiring current position information of a user;
a function of:
identifying, from among a plurality of straight lines each of which connects two corresponding reference locations and wherein each straight line is orthogonal to a current position of the user, a straight line closest to a current position calculated from the acquired current position information;
calculating a movement direction of the user in the identified straight line and a movement speed of the user based on a change in the position information of the user;
selecting any one of the movement information that is stored in the storage unit based on the two reference locations constituting the identified straight line, the calculated movement direction, and the calculated movement speed; and
reading the application specification information associated with the selected movement information from the storage unit; and
a function of activating the application associated with the application specification information that is read.

8. The non-transitory computer readable media according to claim 7, wherein the program further causes the mobile device to execute:
a function of calculating the movement direction of the user based on a history of the acquired position information, selecting any one of the movement information that is stored in the storage unit based on the calculated movement direction and the current position information of the user, and acquiring the application specification information of the application that the user activates, in association with the selected movement information; and
a function of storing the acquired application specification information in association with the movement information in the storage unit.

9. The non-transitory computer readable media according to claim 8,
wherein the storing function in the storage unit is a function of storing the application specification information of the application that is frequently used in association with the movement information for each movement information in the storage unit.

* * * * *